United States Patent [19]
Lee et al.

[11] 3,737,765
[45] June 5, 1973

[54] ISOLATED POWER GROUND FAULT DETECTOR SYSTEM

[75] Inventors: Sung C. Lee, Bridgeport, Conn.; Edward P. Burns, West Redding, Conn.

[73] Assignee: Harvey Hubbell, Incorporated, Bridgeport, Conn.

[22] Filed: June 21, 1971

[21] Appl. No.: 154,795

[52] U.S. Cl. .....................324/51, 340/255, 340/410
[51] Int. Cl. ...............................................G01r 31/02
[58] Field of Search.........................324/51, 52, 130; 340/253, 255, 410

[56] References Cited

UNITED STATES PATENTS

| 3,066,284 | 11/1962 | McKinley et al. | 340/255 |
| 2,695,399 | 11/1954 | Martin | 340/410 |
| 2,897,486 | 7/1959 | Alexander et al. | 324/130 UX |
| 2,832,916 | 4/1958 | Kennedy | 340/255 X |
| 2,226,021 | 12/1940 | Schweitzer | 324/52 X |

*Primary Examiner*—Gerard R. Strecker
*Attorney*—Wooster, Davis & Cifelli

[57] ABSTRACT

A ground fault detector system for isolated power lines, especially those for use with operating room and intensive care monitoring equipment including an isolated test circuit arrangement for checking the operation of the system, that does not itself introduce potentially hazardous and dangerous ground faults into the isolated power lines being monitored. More specifically, the isolated power ground fault detector system of the present invention functions to alternately connect a detector circuit to the power lines at a frequency which is a submultiple of the source frequency. The detector senses both capacitive and resistive ground faults and provides an output voltage signal representative of the magnitude of the ground fault. This output voltage signal is compared to a reference voltage in a voltage comparator which activates alarms and indicators if the ground fault exceeds a preset threshold value. The system also includes a test circuit for checking the operation of the system which when actuated simultaneously switches the detector system from the isolated power lines to auxiliary power lines and introduces a simulated capacitive resistive fault into either of the auxiliary lines. By this arrangement, the system may be checked without introducing a potentially hazardous and dangerous ground fault into the isolated power line supplying the equipment.

7 Claims, 2 Drawing Figures

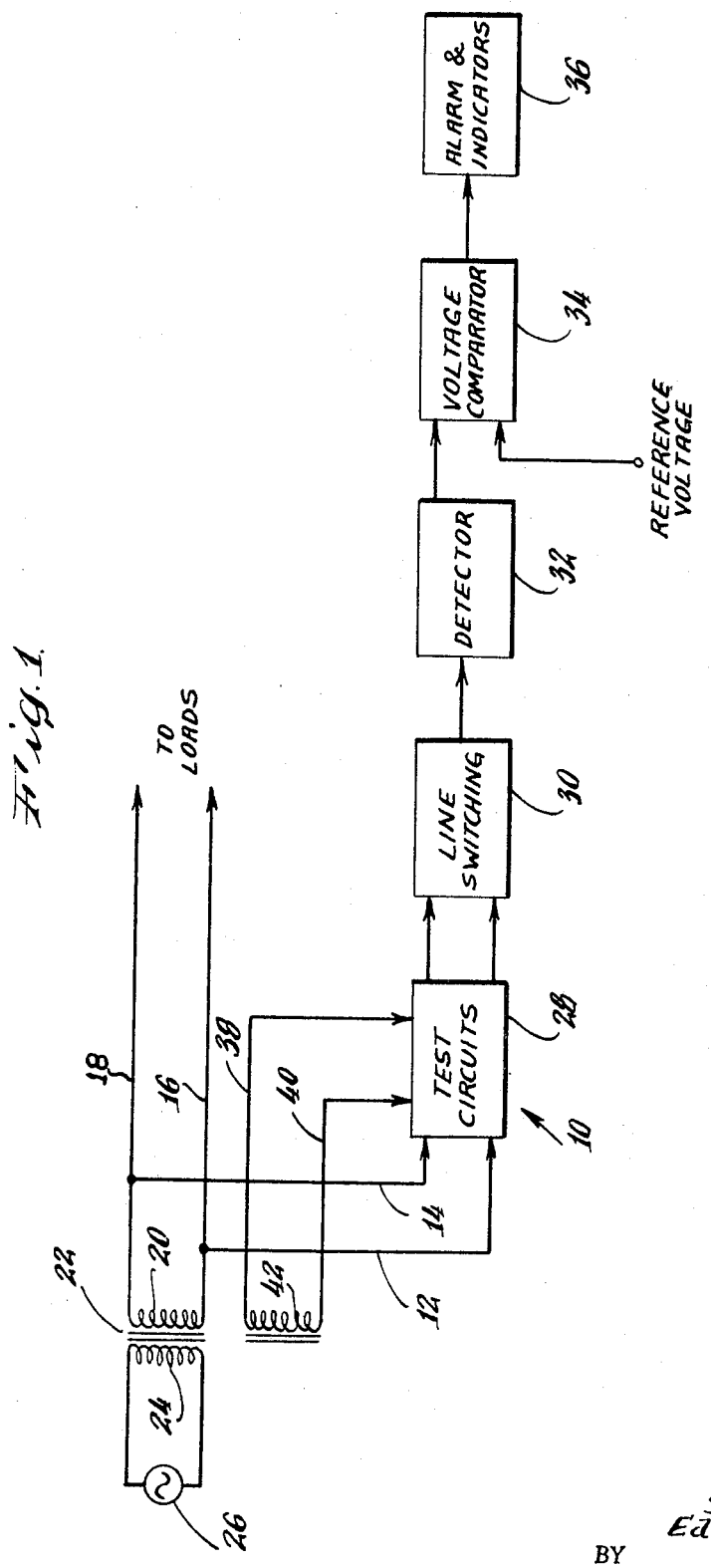

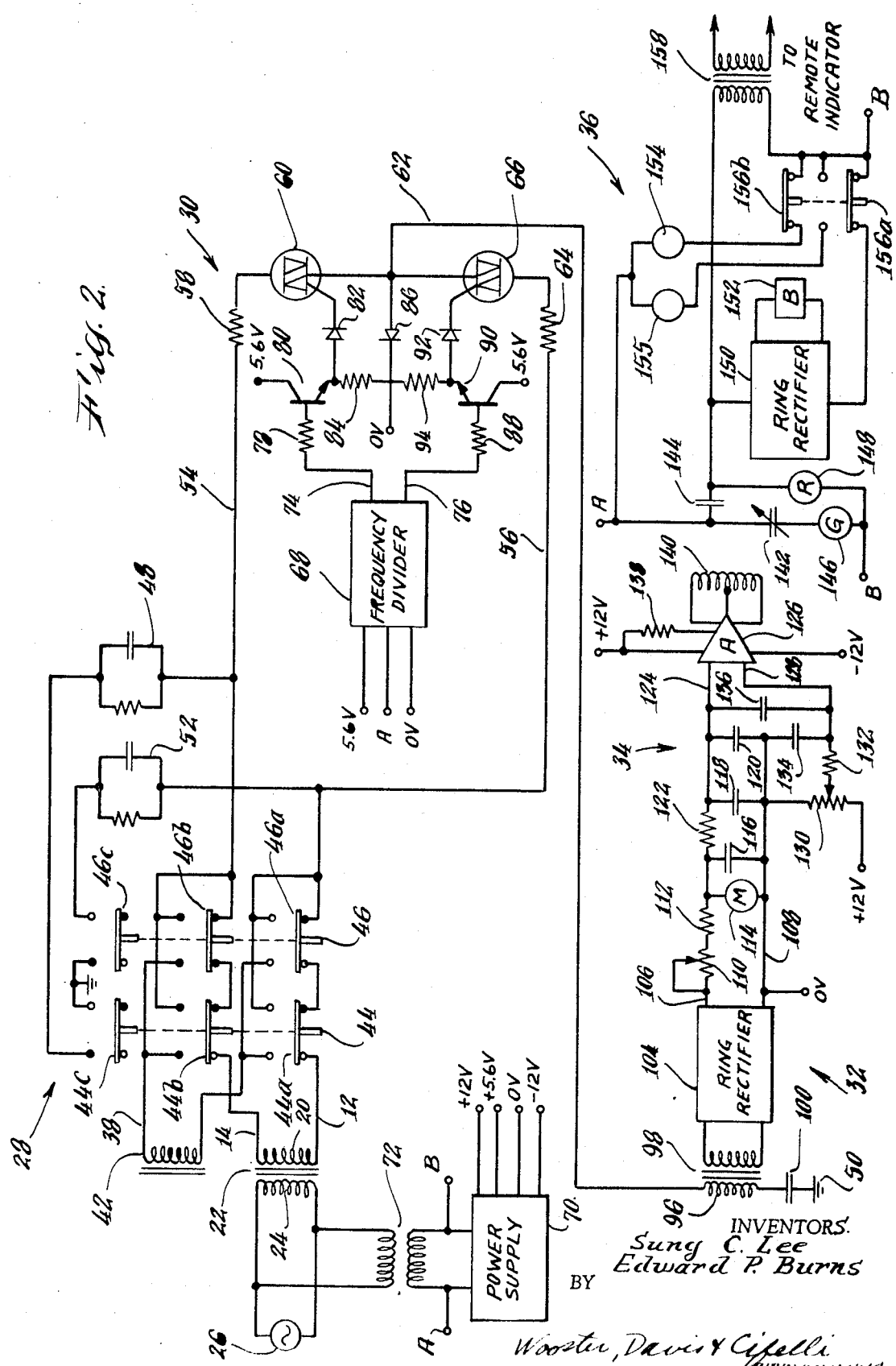

ISOLATED POWER GROUND FAULT DETECTOR SYSTEM

BACKGROUND OF THE INVENTION

This invention relates to ground fault detector systems and more particularly to such a system for use on isolated power lines.

In a standard grounded system which is a three-wire arrangement including a hot line, a neutral line and a grounding line, any single ground fault from either the hot or neutral lines will cause a current to flow through that fault. Although recently developed interrupters are available for sensing such ground faults and opening the circuit in response thereto, the protection offered by such devices may not be sufficient to avoid electrical hazards to persons coming into intimate contact with electrical devices in situations such as in a hospital operating room or intensive care units being monitored by electronic equipment.

This is especially true of persons who may be regarded as electrically sensitive such as those having implanted medical equipment. With regard to such electrically sensitive persons, a current of only 20 microamps may cause heart fibrillation whereas in a normal person a current of 60 milliamps are required to cause heart fibrillation.

It has therefore been recommended by the National Fire Protection Association and widely adopted by hospitals to utilize power lines which are isolated from ground as the power source for operating room and intensive care unit equipment. The isolated power supply minimizes the current that will flow to ground when the initial fault occurs, inasmuch as a closed loop through ground will not exist with a single fault. However, if a single fault from one line exists to ground a potentially hazardous situation exists inasmuch as a second fault on the other line will create a closed loop through which current can flow.

To protect against this occurrence various isolated power ground fault detectors have been suggested to sense a single ground fault on the individual lines. One such detector consists of a center tapped resistor connected between the isolated power lines with a larger resistor and an AC relay connected between the center tap and ground. These detectors, which are referred to as static detectors, are insensitive, however, to certain types of faults especially balanced ground faults.

To avoid this inherent inadequacy of static detectors dynamic detectors have been suggested. These detectors operate on the principle of alternately connecting the detector circuits to the individual power lines to determine if a fault exists thereon. Such detectors have utilized motor driven mechanical switches to alternately connect the power lines to the detector circuit or complex electronic switching arrangements to accomplish the same. Neither of these is well suited to a practical commercial system.

In addition, these known dynamic detectors have included test circuits for connecting a simulated capacitive-resistive fault to the power lines to allow the system to be tested to insure that it is working properly. These test arrangements, however, introduce a great potential hazard inasmuch as they connect the simulated capacitive-resistive fault directly to the power lines supplying the equipment in use. Thus, if the system were not operating properly and a ground fault did exist on one of the lines, the introduction of this simulated ground into the other line would in fact create the dangerous situation which the system, as a whole is designed to protect against. Alternatively, if a person were himself creating one fault to ground, the introduction of such a simulated ground fault to the other line would also create a dangerous situation.

Although it may be presumed that instructions for use of the system would include a warning against operating the test circuits when equipment was in use, inadvertent actuation of the test circuits may occur and could result in causing great harm to persons being operated on or monitored. Furthermore, such test circuits cannot be safely utilized except by removing all persons from such potential danger which in the case of intensive care unit monitoring equipment would require that the monitoring system be interrupted so that the equipment could be checked. This, of course, is quite undesirable inasmuch as it would interrupt the continuous monitoring of patients in intensive care units and interfere with operating schedules.

SUMMARY OF THE INVENTION

The present invention avoids these problems with previously known dynamic detectors by providing an isolated power ground fault detecting system which includes a highly accurate dynamic detector with a simple, practical electronic switching arrangement for alternately connecting the detector to the power lines. Furthermore, the present invention includes a test circuit arrangement which is isolated from the power supply lines and, therefore, introduces no additional hazards to the person being operated on or being monitored by intensive care equipment when the test circuits are actuated. In addition, the present invention provides a remote indicating arrangement which is remote from the equipment being monitored and is isolated from the remainder of the system for increased protection against hazards.

It is, therefore, a general object of the present invention to provide an improved isolated power ground fault detecting system which obviates and minimizes the disadvantages of previously known systems.

It is a more specific object of the present invention to provide an isolated power ground fault detecting system which includes a practical simplified electronic switching arrangement for alternately connecting a detector to the power lines.

It is another object of the present invention to provide an isolated power ground fault detector system which includes an isolated test circuit arrangement which does not introduce additional hazards to the power lines being detected.

It is still another object of the present invention to provide an isolated power ground fault detector system which includes an isolated remote indicating arrangement.

BRIEF DESCRIPTION OF THE DRAWINGS

These, as well as other objects, and advantages of the present invention will be readily apparent to those skilled in the art from a perusal of the appended claims and the following description when read in connection with the attached drawings in which:

FIG. 1 is a partial block diagram of the overall system of the present invention illustrating the connections of the system to the power lines and the overall functional elements of the system; and FIG. 2 is a schematic diagram of the isolated power ground fault detecting system.

DETAILED DESCRIPTION OF THE PREFERRED EMBODIMENT

Referring to FIG. 1 the isolated power grounded detector system of the present invention is illustrated substantially in block form to show in a simplified manner the connections of the system to the isolated power line and the functional elements of the overall system. More specifically, an isolated power ground detector system designated generally as 10 is connected by a pair of conductors 12 and 14 to a pair of isolated line conductors 16 and 18 respectively. The isolated line conductors 16 and 18 are connected to opposite sides of a secondary winding 20 of an isolation transformer 22. A primary winding 24 of the isolation transformer 22 is connected to a conventional source of alternating current 26 which would be typically the conventional electric service of 110 volts or even 220 volts.

The isolated line conductors 16 and 18 are connected through the conductors 12 and 14 to test circuits 28. With the test circuits 28 in their normal rest position, the isolated line conductors 16 and 18 will be directly connected through the test circuits 28 to the line switching portion 30 of the isolated power ground detector system. The line switching portion 30 operates to alternately connect at a frequency which is a submultiple of the frequency of the source 26, the isolated line conductors 16 and 18 to a detector 32 which determines if a ground fault exists on the line conductor so connected. The output signal from the detector 32 is supplied to a voltage comparator 34 which compares the detector output signal to a reference voltage to determine whether the signal exceeds a threshold value and is therefore representative of a ground fault which is to be indicated. When the detector output signal is greater than the reference voltage the voltage comparator will supply an output signal to activate various alarms and indicators 36.

The test circuits 28 are also connected through conductors 38 and 40 to an additional secondary winding 42 of the isolation transformer 22. Alternatively, conductors 38 and 40 could be connected to an entirely independent source of voltage.

The test circuits 28 as will be described in greater detail hereinafter, include a pair of actuating push buttons which when either are actuated simultaneously disconnect conductors 12 and 14 from the line switching portion 30 and connect in their place conductors 38 and 40. The test circuits 28 also include a pair of simulated capacitive-resistive faults each of which are simultaneously connected to the conductors 38 and 40 respectively, upon actuation of the particular push button with which they are associated.

In operation with the test circuits in the normal rest position line conductors 16 and 18 are connected through the conductors 12 and 14 directly to the line switching portion 30. The line switching portion 30 will alternately connect the line conductors 16 and 18 to the detector 32 to provide an output voltage signal representative of the magnitude of any ground fault which might exist on the line conductor so connected. The output signal of the detector 32 is compared to a reference voltage in the voltage comparator 34 to determine if any ground fault signal which may exist exceeds the threshold value set by the reference voltage. If it does, the voltage comparator will provide an output signal which activates the alarms and indicators 36.

If either or both of the pair of push buttons of test circuits 28 are actuated conductors 12 and 14 will be disconnected from the line switching portion 30 and in their place conductors 38 and 40 will be connected to the line switching portion 30. Simultaneously, depending on which push button is actuated, a simulated capacitive-resistive ground fault will be connected between either of the conductors 38 and 40 and ground. If the detector is operating properly, alarms and indicators 36 should indicate the existence of a ground fault. By virtue of the simulated ground faults being connected to the auxiliary line conductors 38 and 40 rather than the line conductors 16 and 18 which supply power to the equipment in use any potential hazard to persons utilizing such equipment is avoided.

The detailed circuitry of the isolated power ground fault detector system will now be described with reference to FIG. 2 wherein like numerals designate like parts of FIG. 1. For purposes of clarity, line conductors 16 and 18 are now shown but rather conductors 12 and 14 are illustrated as being directly connected to the secondary winding 20 of the isolation transformer 22.

The test circuits 28 include a pair of push buttons 44 and 46 each of which include three contact bars 44a, 44b, and 44c and 46a, 46b, and 46c, respectively, with each of the contact bars being simultaneously moved from their rest position to their actuated position on actuation of their respective push button. In the normal rest position the contacts 44a and 46a complete the connection between the conductor 12 and the line switching portion 30. Similarly, the contacts 44b and 46b complete the connection of the conductor 14 to the line switching portion 30. The contacts 44c and 46c are open circuit in their normal rest position.

When the push button 44 is actuated the contact 44a disconnects the conductor 12 from the line switching portion 30 and connects the conductor 40 thereto; the contact 44b disconnects the line conductor 14 from the line switching portion 30 and connects the conductor 38 thereto; and the contact 44c connects a simulated capacitive-resistive fault 48 between the conductor 38 and a ground 50. Similarly, when the push button 46 is actuated, the contact 46a disconnects the conductor 12 from the line switching portion 30 and connects the conductor 40 thereto; the contact 46b disconnects the line conductor 14 from the line switching portion 30 and connects the conductor 38 thereto; and the contact 46c connects a second capacitive-resistive fault 52 between the conductor 40 and the ground 50.

Thus, it can be seen that actuation of either of the push buttons 44 or 46 will operate to disconnect the detector system from the line conductors 16 and 18 supplying the various equipment and, in their place connect the detector system to the auxiliary conductors 38 and 40. Simultaneously, the actuation of the push button 44 will connect the simulated capacitive-resistive fault 48 between the conductor 38 and the ground 50, and actuation of the push button 46 will connect the simulated capacitive-resistive fault 52 between the line conductor 40 and the ground 50. Thus, the potentially hazardous simulated ground fault is not connected to the line conductors 16 and 18 supplying the equipment being used.

Depending on whether either of the push buttons 44 and 46 are actuated, either conductor 14 or 38 will be connected to a conductor 54 of the line switching portion 30 and either conductor 12 or conductor 40 will be connected to a conductor 56 of the line switching portion 30. The conductor 54 is connected to a resistor 58 which in turn is connected to the anode of a triac 60. The cathode of the triac 60 is connected to a conductor 62 which leads to the detector 32. Similarly, conductor 56 is connected to a resistor 64 which is connected to the anode of a triac 66 whose cathode is connected to the conductor 62. Both of the triacs 60 and 66 are controlled by the output signals of a frequency divider 68 which may be any commercially available frequency divider and may, for example, be a series of flip-flops each of which divide the input frequency by two.

The frequency divider 68 is supplied appropriate DC voltage level bias signals, for example, 5.6 volts and 0 volts from the output of a power supply 70. Power supply 70 is energized through a transformer 72 from the source voltage 26. Frequency divider 68 is also triggered with an input frequency identical to the frequency of the source 26 by virtue of its connection to a terminal A which is connected to one side of the secondary winding of the transformer 72. With the source frequency normally being 60 Hz, the frequency divider will provide a suitable submultiple of that frequency, such as 7½ Hz.

The frequency divider 68 has two outputs 74 and 76 which are alternately high. The output 74 is connected through resistor 78 to the base of an NPN transistor 80. The emitter of transistor 80 is connected through a diode 82 to the gate of the triac 60 and through resistor 84 to the cathode of a diode 86, the anode of which is connected to the conductor 62. Resistor 84 is also connected to the 0 voltage DC level of the power supply 70. Similarly, output 76 is connected through a resistor 88 to an NPN transistor 90. The emitter of the transistor 90 is connected through a diode 92 to the gate of the triac 66 and through resistor 94 to the cathode of the diode 86. The collectors of both transistors 80 and 90 are provided with a DC bias voltage of 5.6 volts from the power supply 70.

In operation, the frequency divider 68 will divide the source frequency to provide alternate high signals at the output 74 and 76 at a frequency which is a submultiple of the source frequency. When output 74 is high, the transistor 80 will be turned on thereby providing a trigger voltage on the gate of triac 60 to turn it on, thereby connecting either the line conductor 14 or the conductor 38 to the conductor 62 of the detector 32. Similarly, when the signal on output 76 is high transistor 90 will be turned on thereby providing a trigger voltage to the gate of triac 66 to turn it on thereby connecting either line conductor 12 or the conductor 40 to the conductor 62. Thus, triac 60 and 66 act as switches which alternately connect the conductors being sensed to the detector circuit 32. The resistors 58 and 64 serve to block any backcurrent which may flow during the instance of switching.

Conductor 62 is connected to one side of a primary winding 96 of a transformer 98. The other side of the primary winding 96 is connected through a capacitor 100 to the ground 50. A secondary winding 102 of the transformer 98 is connected to a conventional ring rectifier 104 which has two output lines 106 and 108. The output line 106 is connected through a variable resistor 110 and a series connected resistor 112 to one side of an ohmmeter 114, the other side of the ohmmeter 114 is connected to line 108 which is also connected to the 0 voltage DC level from the power supply 70. The ohmmeter 114 is calibrated to give a direct reading of the magnitude of any capacitive-resistive fault which may exist on the conductor being sensed. The voltage across ohmmeter 114 is representative of the magnitude of any ground fault which may exist and is connected through a capacitive-resistive filtering network to the voltage comparator 34. More specifically, the capacitive-resistive network includes parallel capacitors 116, 118 and 120 connected across the ohmmeter 114 with a resistor 122 connected between the capacitors 116 and 118.

If a ground fault exists on the conductor 18 being detected a closed path will exist from ground to ground through the ground fault, the conductor 54, the resistor 58, the triac 60, the primary winding 96, and the capacitor 100. The current flowing in this path will be detected through the transformer 98, rectified by the ring rectifier 104 and create a voltage across the ohmmeter 114 as well as being indicated in ohms thereon. This voltage is filtered and applied to the voltage comparator 34.

This voltage is applied to one input 124, of an amplifier 126. Another input 128 of the amplifier 126 is connected to a potentiometer 130 through a resistor 132 which is connected between the 12 volt DC bias level from the power supply 70 to the 0-volt DC bias level thereof. This reference voltage, which may be selectively adjusted by adjustment of the potentiometer 130, is filtered by a capacitor 134 connected between the input 128 and the 0-voltage DC level and a capacitor 136 connected between the inputs 124 and 128. The amplifier 126 receives appropriate DC bias levels which for example are the plus and minus 12 volt DC levels from the power supply 70 and through resistor 138 which is connected to the plus 12 DC voltage level thereof.

The output of the amplifier 126 is connected to a relay coil 140 which controls relay contacts 142 and 144, which in turn control the actuation of the alarms and indicators 36. Thus, the voltage across meter 114, which is representative of any ground fault that may exist, is compared to a selectively adjustable reference voltage across the potentiometer 130 by the amplifier 126 which will actuate the relay coil 140 when the voltage across the ohmmeter 114 exceeds the selected reference voltage.

Relay contact 142 is normally closed and connects a green pilot light 146 between terminals A and B which are connected to the secondary of the transformer 72 thereby supplying isolated AC voltage to energize the green pilot light 146. Similarly, contact 144 which is normally open, connects a red pilot light 148 across the secondary of the transformers 72 by virtue of terminals A and B. The relay contact 144 further connects a ring rectifier 150 across the terminals A and B which is connected to a buzzer 152.

The alarm and indicators portion 36 includes pilot lights 154 and 155 which are selectively connected across the terminals A and B by means of a push button 156 having a pair of contacts 156a and 156b. In the normal rest position contact 156a connects the ring rectifier 150 to terminal B; and in its actuated position disconnects the ring rectifier 150 therefrom and connects the pilot light 155 between terminals A and B. In the normal rest position the contact 156b connects the pilot light 154 to the terminals A and B; and in its actuated position disconnects pilot light 154 therefrom. Relay contact 144 also connects the terminal A to one side of a primary winding of a transformer 158, the secondary winding of which is connected to appropriate remote indicators.

In operation if no ground fault is present on the line being tested, relay coil 140 will not be energized therefore leaving relay contact 142 in its normally closed position and relay contact 144 in its normally open position. By virtue of the closed position of relay contact 142 the green pilot light 146 will be energized thereby indicating a safe condition of the conductors being tested. With the relay contact 144 being open, the red pilot light 148, the buzzer 152, and the remote indicators connected across the secondary winding of the transformer 158 will be deenergized.

If, however, a ground fault is detected, which is of sufficient magnitude to energize the relay coil 140, the relay contact 142 will be opened thereby deenergizing the green pilot light 146 and the relay contact 144 will be closed thereby energizing the red pilot light 148 to indicate an unsafe condition. The closing of the relay contact 144 will also energize the buzzer 152 through the ring rectifier 150 to sound an alarm and energize the remote indicators through the transformer 158.

With the push button 156 in its normal rest position, the ring rectifier 150 is connected across the terminals A and B through the contact 156a thereby allowing the buzzer to be sounded should a ground fault be sensed. In addition, the contact 156b will connect the pilot light 154 across the terminals A and B so that it is energized. If, however, it is desired not to have the buzzer sound, then the push button may be placed in its actuated position to disconnect the ring rectifier from the terminal B thereby deenergizing the buzzer. Actuation of the push button 156 will also disconnect the pilot light 154 and energize the pilot light 155 to indicate that the buzzer has been disconnected. It is noted that in the actuated position of the push button 156 the green and red pilot lights 146 and 148 as well as the remote indicators will still be energized as appropriate.

The particular values for the various elements in the circuitry of FIG. 2 depends, of course, on the magnitude of the ground fault which is desired to be sensed, and are readily determinable by those skilled in the art.

Thus, the present invention provides an isolated power ground fault detecting system which can accurately determine the presence of a ground fault whether capacitive or resistive, whether on a single line conductor or balanced and which can be tested as desired without introducing any potential hazardous or dangerous ground faults into the line conductors supplying power to the equipment in use. It is believed that the many advantages of the present invention will now be apparent to those skilled in the art. It will also be apparent that a number of variations and modifications may be made without parting from its spirit and scope. Accordingly, the foregoing description is to be considered as illustrative only, rather than limiting.

What is claimed is:

1. A ground fault detecting system for detecting ground faults that may occur on any individual line conductor of power lines isolated from ground comprising:

detector means for detecting ground faults that may occur on a line conductor;

line switching means connected between said detector means and said power line for alternately connecting each of said line conductors of said power lines to said detector means;

indicator means connected to said detector means for providing an indication when a ground fault is detected; and test circuit means connected between said line switching means and said power lines for testing the operation of the system, said test circuit means including auxiliary conductors independent of said power lines, a simulated ground fault adapted to be selectively connected to individual conductors of said auxiliary conductors and switching means for switching said line switching means from said power lines to said auxiliary conductors and simultaneously selectively connecting said simulated ground fault to an individual conductor of said auxiliary conductor.

2. The ground fault detecting system of claim 1 further comprising:

comparator means connected between said detector means and said indicator means for comparing an output signal of said detector means to a predetermined threshold value; and wherein said indicator means provide an indication of a ground fault only when said output signal of said detector means exceeds said threshold value.

3. The ground fault detecting system of claim 2 wherein said output signal of said detector means is a voltage representative of the magnitude of a detected ground fault, said comparator means is a voltage comparator and said threshold value is a selectively adjustable reference voltage supplied to said voltage comparator.

4. The ground fault detecting system of claim 1 wherein said indicator means includes a remote indicator isolated from said system, a selectively connected sound alarm, and a pair of pilot lights, one of said pilot lights being energized so long as no ground fault is detected and the other of said pilot lights being energized only when a ground fault is detected.

5. The ground fault detecting system of claim 1 wherein said line switching means includes:

a plurality of solid state switching devices connected to said detector means, each of which are adapted to be connected through said test circuit means to an individual line conductor of said power lines or an individual conductor of said auxiliary conductors; and frequency divider means connected to a power source supplying power to said power lines for dividing the frequency of said power source, said frequency divider means being connected to each of said solid state switching devices to alternately turn said solid state switching devices on so as to alternately connect said line conductors of said power lines or said conductors of said auxiliary conductors to said detector means.

6. The ground fault detecting system of claim 5 wherein said line switching means further includes a plurality of resistors each of which are connected between said test circuit means and individual ones of said solid state switching devices.

7. The ground fault detecting system of claim 1 wherein said switching means of said test circuit means comprise a plurality of push buttons, one for each line conductor of said power lines, each of said push buttons including a contact bar for each of said line conductors of said power lines which in their normal rest position connect said line conductors to said line switching means and in their actuated position connect said conductors of said auxiliary conductors to said line switching means and a contact bar which in its actuated position connects a simulated ground fault between an individual conductor of said auxiliary conductor and ground.

* * * * *